United States Patent
Flender et al.

(10) Patent No.: US 8,936,002 B2
(45) Date of Patent: Jan. 20, 2015

(54) CYLINDER HEAD

(75) Inventors: Thomas Flender, Eberdingen (DE); Michael Kreisig, Stuttgart (DE); Falk Schneider, Korntal-Münchingen (DE); Stefan Steichele, Gerlingen (DE)

(73) Assignee: Mahle International GmbH (DE)

( * ) Notice: Subject to any disclaimer, the term of this patent is extended or adjusted under 35 U.S.C. 154(b) by 660 days.

(21) Appl. No.: 13/097,591

(22) Filed: Apr. 29, 2011

(65) Prior Publication Data
US 2011/0265756 A1 Nov. 3, 2011

(30) Foreign Application Priority Data
Apr. 30, 2010 (DE) .......... 10 2010 019 130

(51) Int. Cl.
| | | |
|---|---|---|
| F01L 1/047 | (2006.01) |
| F16C 19/10 | (2006.01) |
| F16C 19/30 | (2006.01) |
| F16C 19/54 | (2006.01) |

(52) U.S. Cl.
CPC ............. *F01L 1/047* (2013.01); *F16C 19/10* (2013.01); *F16C 19/30* (2013.01); *F16C 19/545* (2013.01); *F01L 2001/0476* (2013.01); *F16C 2360/18* (2013.01)
USPC ............ 123/193.5; 123/193.3; 123/90.34; 123/90.31; 123/90.27; 123/321

(58) Field of Classification Search
CPC .. F01L 2001/0476; F01L 1/047; F16C 19/14; F16C 19/185; F16C 2360/18; F01M 9/102; F02F 7/0065
USPC ............ 123/90.31, 90.27, 90.34, 90.33, 321, 123/193.3, 193.5
See application file for complete search history.

(56) References Cited

U.S. PATENT DOCUMENTS

| | | | |
|---|---|---|---|
| 6,804,884 B1* | 10/2004 | Vogel ........................... 29/888.1 |
| 2007/0039411 A1* | 2/2007 | Lechner et al. ................. 74/567 |
| 2008/0289592 A1* | 11/2008 | Flender et al. ............... 123/90.6 |

FOREIGN PATENT DOCUMENTS

| | | |
|---|---|---|
| DE | 102006036851 A1 | 6/2007 |
| DE | 102007024092 A1 | 11/2008 |
| EP | 1955417 A1 | 8/2008 |
| EP | 2078829 A1 | 7/2009 |

OTHER PUBLICATIONS

English abstract for DE-102006036851, Jun. 28, 2007.

* cited by examiner

*Primary Examiner* — Lindsay Low
*Assistant Examiner* — Kevin Lathers
(74) *Attorney, Agent, or Firm* — Rader, Fishman & Grauer PLLC

(57) ABSTRACT

A cylinder head of an internal combustion engine comprises a camshaft that is mounted in the axial direction via at least one rolling bearing, wherein the at least one rolling bearing may be formed such that all occurring axial forces may be absorbed via the at least one rolling bearing.

17 Claims, 2 Drawing Sheets

CYLINDER HEAD

CROSS-REFERENCES TO RELATED APPLICATION

This application claims priority to German patent application DE 10 2010 019 130.2 filed on Apr. 30, 2010, which is hereby incorporated by reference in its entirety.

TECHNICAL FIELD

The present invention relates to a cylinder head having a camshaft mounted therein according to the preamble of the claim 1.

BACKGROUND

Camshafts in internal combustion engines serve for controlling the intake and exhaust valves and are driven by a crankshaft of the internal combustion engine. Since the camshaft has a high rotational speed, it is essential for a reliable functioning of the camshaft to properly mount the same in the axial direction as well as in the radial direction.

From EP 1 995 417 B1, a cylinder head of an internal combustion engine with a camshaft is known, which camshaft is mounted via at least one roller bearing on a cylinder head housing. Here, at least one axial bearing is provided which supports the camshaft in the axial direction and which is formed at the same time as ball bearing or also as roller bearing. However, the known axial bearings support the camshaft mainly in the radial direction and only to a certain extent in the axial direction because the axial bearings known from EP 1 995 417 B1 allow only a limited absorption of axial forces. More precisely, the known axial bearings are rather axial/radial bearings and, besides radial forces, absorb also a small portion of axial forces. However, due to the known embodiments of the axial bearings, the bearing forces of the same are limited. Usually, the axial bearing forces for camshafts are absorbed via so-called thrust washers which are also designated as "thrust plate", wherein such thrust washers have a significantly shorter lifespan compared to other bearing devices so that they usually have to be replaced regularly and, at the same time, they represent only slide bearings which require an additional lubrication system and can stick during a standstill of the internal combustion engine and subsequently require certain release forces. All these relatively negative bearing properties result in a higher fuel consumption which is not to be underestimated.

SUMMARY

The present invention is therefore concerned with the problem to provide for a cylinder head having a camshaft of the generic kind mounted therein, an improved embodiment which is in particular characterized by a particularly smooth-running mounting of the camshaft in the axial direction.

This problem is solved according to the invention by the subject matter of the independent claim 1. Advantageous embodiments are subject matter of the dependent claims.

The present invention is based on the general idea to absorb all axial forces occurring in the axial direction when mounting a camshaft via at least one rolling bearing formed for this purpose and thereby to make previously required additional slide bearings, such as thrust washers, completely disposable. In the cylinder head according to the invention of an internal combustion engine, thus, the camshaft is supported in the axial direction via at least one rolling bearing, wherein the at least one rolling bearing is formed at the same time in such a manner that via the latter all occurring forces can be absorbed. In contrast to bearing types known from the prior art, for example radial bearings, which, at the same time, are able to absorb minor axial forces, or also slide bearings, the axial rolling bearing according to the invention offers the great advantage of a smoothly-running axial mounting of the camshaft, wherein the rolling bearing according to the invention, at the same time, does not require a separate lubrication system which, in addition, reduces the constructional expenditure for implementing such an axial bearing. Also, such a rolling bearing according to the invention offers the great advantage that it does not stick during the standstill of the internal combustion engine so that when starting the internal combustion engine, no release forces have to be overcome. Due to the bearing friction in rolling bearings which is considerably lower compared to the previously known slide bearings, moreover, the fuel consumption of a motor vehicle equipped with such an internal combustion engine can be significantly reduced, for example by approx. 2%, which is of great advantage with respect to permanently increasing fuel prices as wells as to the emission behavior. The rolling bearing according to the invention can be lubricated by the oil mist which is present in the cylinder head or cylinder crankcase anyway, without the need for a separate lubrication system so that also a previously required oil pump can be dimensioned smaller.

In an advantageous development of the solution according to the invention, a rolling element raceway is incorporated on the axial front side of a cam, a drive gear and/or a bearing block, in which rolling element raceway, the balls/rollers/rolling elements run. Such a configuration of the rolling bearing according to the invention allows a space-optimized accommodation of the same because it can be integrated in a recessed manner in two adjacent components, for example in a bearing block and a drive gear, that is, without required installation space in the axial direction. Such a solution is in particular of great advantage for the confined installation spaces in today's engine compartments.

Further important features and advantages of the invention arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the context of the present invention.

Preferred exemplary embodiments of the invention are illustrated in the drawings and are explained in the following description in more detail, wherein identical reference numbers refer to identical, or similar, or functionally identical components.

DETAILED DESCRIPTION

Figure 1:
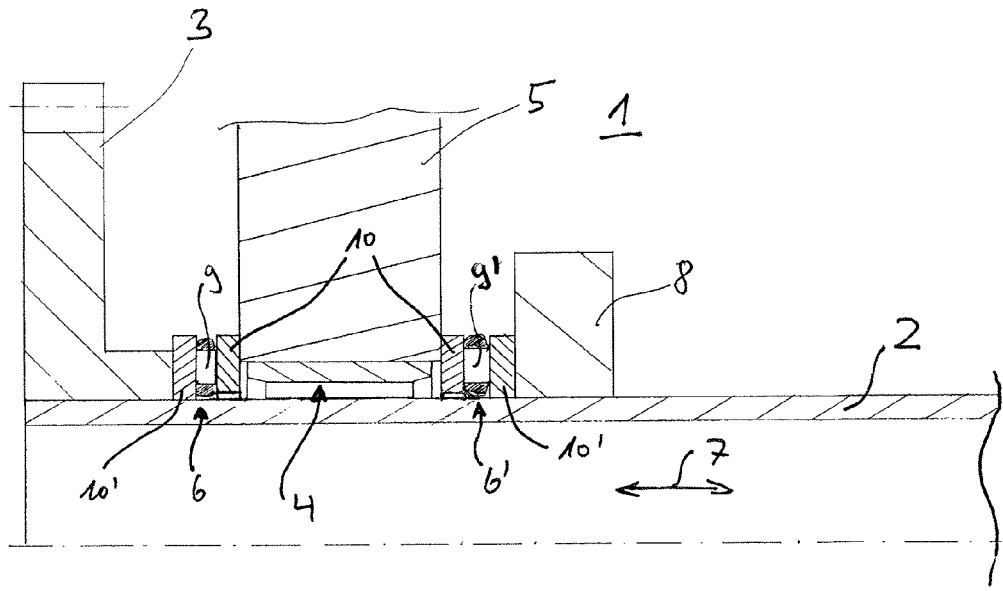
FIG. 1 shows a sectional view through a cylinder head having axial bearing means according to the invention of a camshaft.

According to the FIGS. 1 to 4, a cylinder head 1 of a non-illustrated internal combustion engine has a camshaft 2 mounted in said cylinder head. The camshaft 2 serves in a known manner for controlling intake/exhaust valves and is driven for example by means of a chain/belt drive by a crankshaft of the internal combustion engine. The torque transmission takes place via a drive gear 3. In order to achieve a mounting of the camshaft 2 running as smooth as possible, the latter is usually supported in the radial direction via rolling bearings 4 which are formed, for example, as ball, needle or roller bearings. The rolling bearing 4 is arranged here between the camshaft 2 and a bearing block 5 of the cylinder head 1. The mounting of the camshaft in the axial direction has previously been implemented via slide bearings, for example via so-called thrust washers, wherein, compared to rolling bearings, such slide bearings have a significantly higher friction and thereby are much more rough-running. Moreover, such slide bearings always involve the risk that during the standstill of the internal combustion engine, the camshaft 2 sticks in the region of the slide bearing and therefore, a release force has to be overcome first when starting the internal combustion engine. Therefore, according to the invention, the camshaft 2 is mounted in the axial direction 7 via at least one rolling bearing 6, wherein the at least one rolling bearing 6 is formed such that via the latter, all occurring axial forces can be absorbed. According to FIG. 1, i.e. according to a first embodiment variant, the axial rolling bearing 6 is arranged between the drive gear 3 and the bearing block 5. In addition, a further axial bearing 6' is provided which is arranged between the bearing block 5 and a cam 8 of the camshaft 2. The rolling bearings 6, 6' each have cylindrical rolling elements 9, 9', wherein it is of course also possible that the rolling elements 9, 9' are formed as balls. By viewing the FIG. 1 it is apparent that for each rolling bearing 6, 6', a bearing ring 10 fixedly connected to the bearing block 5 and a bearing ring 10' fixedly connected in each case to the camshaft 2 are provided which are axially spaced apart from each other and between which the rolling elements 9, 9' are rollingly mounted.

Figure 2:
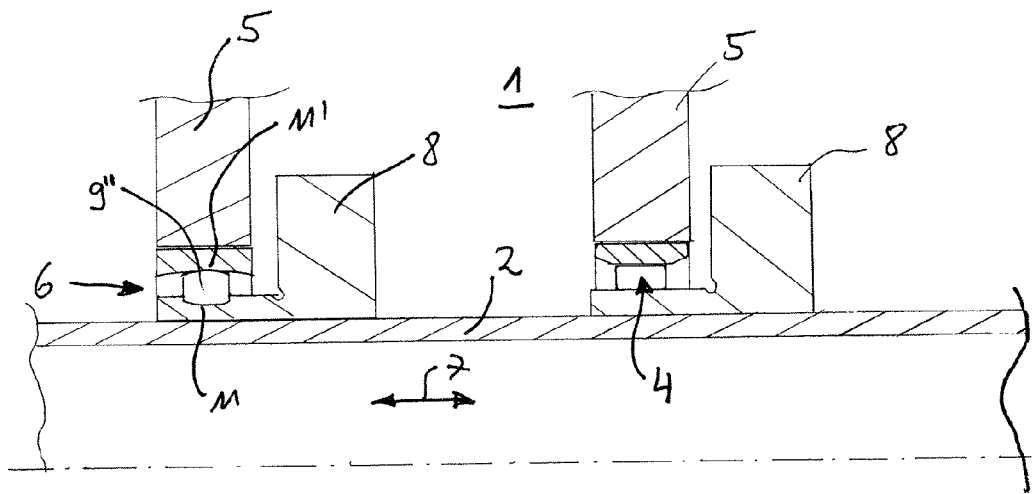
FIG. 2 shows an illustration as in FIG. 1, but in a different embodiment of the axial bearing means of the camshaft, FIG. 3, 4 show further alternative embodiments of the axial bearing means of the camshaft.

In contrast to that, according to FIG. 2, an embodiment of the rolling bearing 6 is shown in which a barrel-shaped rolling element 9" is used which runs in a rolling element raceway 11 and 11' formed complementary thereto. The rolling element raceway 11 is arranged here on an axial extension of the cam 8 and is formed complementary to the rolling element 9", whereas the opposing rolling element raceway 11' has a concave shape. Through the interaction of the rolling element raceways 11, 11' with the associated barrel-shaped rolling element 9", the absorption of all occurring axial forces is possible. Of course, the rolling bearing 6 according to the invention can also serve for radially mounting the camshaft 2.

Figure 3:
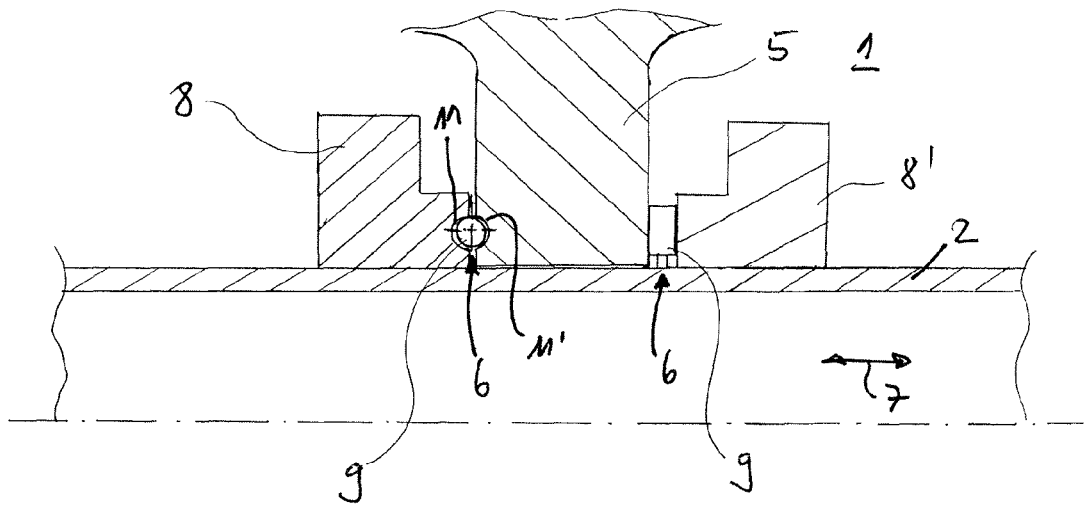

According to FIG. 3, a cylinder head 1 is shown in which in the cam 8 as well as in the bearing block 5 adjacent thereto in each case one rolling element raceway 11 and 11' is incorporated in which the rolling elements 9 run which are formed here as balls. This has the particular advantage that the axial rolling bearing 6 requires almost no installation space and therefore is accommodated in a space-optimized manner. Between the bearing block 5 and a further cam 8', a further axial rolling bearing 6 is arranged, wherein the same is formed as cylinder roller bearing and thus has rolling elements 9 formed like cylinder rollers. In this case, the cylinder rollers, i.e. the rolling elements 9 run directly on an axial front side of the bearing block 5 or the cam 8'.

Figure 4:
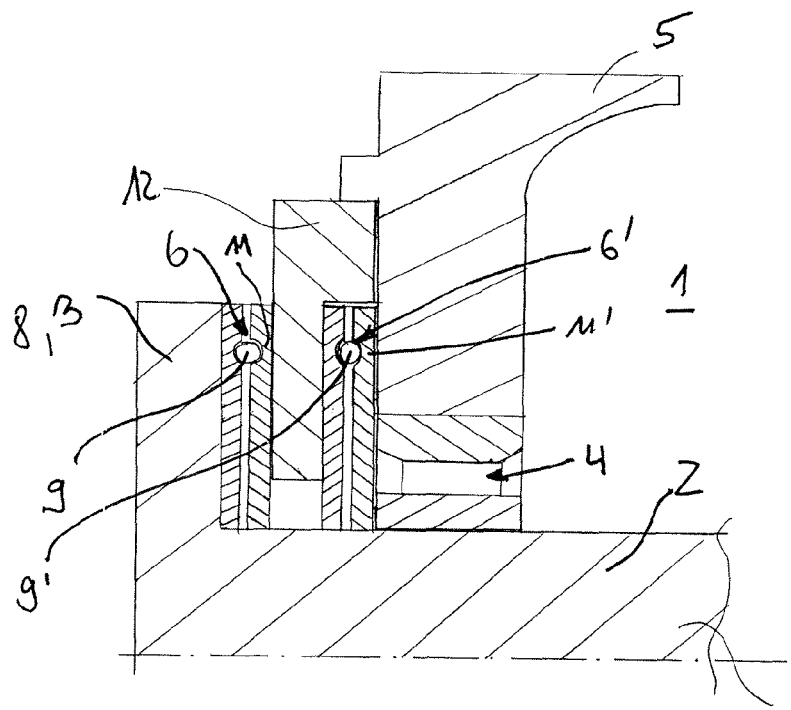

In an embodiment according to FIG. 4, two rolling bearings 6 and 6' are provided, namely a first rolling bearing 6 between a cam 8 or a drive gear 3 on the one side and a Thrust washer/thrust plate 12 on the other side as well as a second rolling bearing 6' between the thrust washer/thrust plate 12 and the bearing block 5, wherein the respective rolling element raceway 11, 11' lies in a radially outer region. The camshaft 2 according to FIG. 4 is formed here as solid shaft, wherein it is of course also possible that—as shown in the FIGS. 1 to 3—the same is formed as hollow shaft.

With the rolling bearing 6, 6' according to the invention which acts in the axial direction, a previously commonly used slide bearing can be replaced and therefore, significantly better bearing properties can be achieved. In particular, via such a rolling bearing 6, 6', a reduction of the fuel consumption of approx. 2% can be achieved and a release force when starting the internal combustion engine can be prevented, which release force is required in particular in case of slide bearings. Since the oil mist, which is present in the cylinder head 1 anyway, is sufficient for lubricating the rolling bearing 6, 6' according to the invention, a constructionally complicated and expensive lubrication system for the rolling bearings is eliminated, whereby in particular lubricant pumps can be dimensioned smaller and thus can be designed in a more cost-effective manner.

The invention claimed is:

1. A cylinder head of an internal combustion engine comprising: a camshaft including at least one cam mounted thereon, the camshaft being mounted in the axial direction via at least one rolling bearing arranged on at least one of the cam;
   a bearing block, and a drive gear, the at least one rolling bearing including one of a pair of oppositely disposed rolling element raceways and bearing rings incorporating at least one rolling element, wherein the at least one rolling bearing is formed such that all occurring axial forces can be absorbed via the at least one rolling bearing; and
   further comprising a second rolling bearing formed as a cylinder roller bearing disposed between one of the at least one cams and the bearing block, wherein the cylinder roller runs directly on one of the at least one cams and the axial front side of the bearing block.

2. The cylinder head according to claim 1, wherein the at least one rolling bearing is formed as at least one of a ball bearing, a bearing with barrel-shaped rolling elements and as a cylinder roller bearing.

3. The cylinder head according to claim 2, wherein the at least one rolling bearing is disposed between the drive gear and the bearing block.

4. The cylinder head according to claim 3, further comprising a further rolling bearing disposed between a cam and a bearing block.

5. The cylinder head according to claim 2, further comprising a cam having an axial front side and the rolling element raceway incorporated in at least one rolling element of the at least one rolling bearing.

6. The cylinder head according to claim 5, wherein the at least one rolling element is a barrel-shaped rolling element running complimentary to the at least one rolling element raceway.

7. The cylinder head according to claim 6, further comprising an axial extension is disposed on the cam having the at least one rolling element raceway formed complementary to the barrel-shaped rolling element, and wherein the opposing rolling element raceway has a concave shape.

8. The cylinder head according to claim 5, wherein the at least one rolling bearing includes a first rolling bearing between the cam and a thrust washer/thrust plate and a second rolling bearing between the thrust washer/thrust plate and the bearing block, and wherein the respective rolling element raceway lies in a radially outer region.

9. The cylinder head according to claim 1, wherein the at least one rolling bearing is disposed between the drive gear and the bearing block.

10. The cylinder head according to claim 9, further comprising a cam having an axial front side and the rolling element raceway incorporated in at least one rolling element of the at least one rolling bearing.

11. The cylinder head according to claim 10, wherein the at least one rolling element is a barrel-shaped rolling element running complimentary to the at least one rolling element raceway.

12. The cylinder head according to claim 11, further comprising an axial extension disposed on the cam having the at least one rolling element raceway formed complementary to the barrel-shaped rolling element, and wherein the opposing rolling element raceway has a concave shape.

13. The cylinder head according to claim 10, wherein the at least one rolling bearing includes a first rolling bearing between the cam and a thrust washer/thrust plate and a second rolling bearing between the thrust washer/thrust plate and the bearing block, and wherein the respective rolling element raceway lies in a radially outer region.

14. The cylinder head according to claim 1, further comprising a cam having an axial front side and the rolling element raceway incorporated in at least one rolling element of each of the at least one rolling bearings.

15. The cylinder head according to claim 14, wherein the at least one rolling element is a barrel-shaped rolling element running complimentary to at least one rolling element raceway.

16. The cylinder head according to claim 15, further comprising an axial extension disposed on the cam having the at least one rolling element raceway formed complementary to the barrel-shaped rolling element, and wherein the opposing rolling element raceway has a concave shape.

17. The cylinder head according to claim 14, wherein the at least one rolling bearing includes a first rolling bearing between the cam and a thrust washer/thrust plate and a second rolling bearing between the thrust washer/thrust plate and the bearing block, and wherein the respective rolling element raceway lies in a radially outer region.

* * * * *